(12) United States Patent
Valentine et al.

(10) Patent No.: US 8,938,731 B2
(45) Date of Patent: Jan. 20, 2015

(54) COST OPTIMIZATION FOR FIRMWARE UPDATES FOR GLOBALLY MOBILE MACHINE-TO-MACHINE DEVICES

(71) Applicant: Telefonaktiebolaget L M Ericsson (Publ), Stockholm (SE)

(72) Inventors: Eric Lee Valentine, Plano, TX (US); Inayat Syed, Richardson, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 125 days.

(21) Appl. No.: 13/659,115

(22) Filed: Oct. 24, 2012

(65) Prior Publication Data

US 2014/0115574 A1    Apr. 24, 2014

(51) Int. Cl.
*G06F 9/44* (2006.01)
*G06F 9/445* (2006.01)

(52) U.S. Cl.
USPC ............................ 717/173; 717/172; 717/177

(58) Field of Classification Search
CPC ............... G06F 8/65; G06F 8/61; G06F 8/60; H04L 29/08981
See application file for complete search history.

(56) References Cited

U.S. PATENT DOCUMENTS

| | | | |
|---|---|---|---|
| 6,658,090 B1 * | 12/2003 | Harjunen et al. | 717/173 |
| 6,687,901 B1 * | 2/2004 | Imamatsu | 717/177 |
| 6,877,037 B1 * | 4/2005 | Adachi | 717/177 |
| 7,584,470 B2 * | 9/2009 | Barker et al. | 717/172 |
| 8,245,220 B2 * | 8/2012 | Imamatsu | 717/173 |
| 8,305,264 B1 * | 11/2012 | Jones et al. | 342/357.22 |
| 8,418,168 B2 * | 4/2013 | Tyhurst et al. | 717/173 |
| 8,509,754 B2 * | 8/2013 | Poplett et al. | 717/172 |
| 8,769,525 B2 * | 7/2014 | Dirstine et al. | 717/173 |
| 2005/0125525 A1 * | 6/2005 | Zhou et al. | 717/173 |
| 2005/0240921 A1 * | 10/2005 | Barker et al. | 717/177 |
| 2009/0300596 A1 * | 12/2009 | Tyhurst et al. | 717/173 |
| 2010/0099432 A1 | 4/2010 | Glover et al. | |
| 2010/0162374 A1 * | 6/2010 | Nair | 717/172 |
| 2010/0177663 A1 * | 7/2010 | Johansson et al. | 370/254 |
| 2010/0333082 A1 * | 12/2010 | Keys et al. | 717/173 |
| 2011/0194458 A1 * | 8/2011 | Nieuwland et al. | 370/254 |
| 2011/0208702 A1 * | 8/2011 | Minde et al. | 707/687 |
| 2011/0252240 A1 * | 10/2011 | Freedman et al. | 713/169 |
| 2011/0295992 A1 * | 12/2011 | Lee et al. | 709/223 |
| 2011/0302571 A1 * | 12/2011 | O'Farrell et al. | 717/173 |
| 2012/0036552 A1 * | 2/2012 | Dare et al. | 717/177 |
| 2012/0047204 A1 * | 2/2012 | Lee et al. | 709/203 |
| 2013/0139143 A1 * | 5/2013 | Rauma | 717/173 |

(Continued)

FOREIGN PATENT DOCUMENTS

EP    2 677 440 A2    3/2012

OTHER PUBLICATIONS

Song et al., "Connecting and Managing M2M Devices in the Future Internet", Nov. 5, 2013, Springer, pp. 1-17; <http://link.springer.com/article/10.1007%2Fs11036-013-0480-9#page-1>.*

(Continued)

*Primary Examiner* — Thuy Dao
*Assistant Examiner* — Ben C Wang
(74) *Attorney, Agent, or Firm* — Roger S. Burleigh (57) ABSTRACT

A firmware control management device and a method implemented by the firmware control management device are described herein which are configured to determine whether or not to push a firmware update to a machine-to-machine (M2M) device.

26 Claims, 5 Drawing Sheets

(56) References Cited

U.S. PATENT DOCUMENTS

| | | | |
|---|---|---|---|
| 2013/0160140 A1* | 6/2013 | Jin et al. | 726/27 |
| 2013/0219064 A1* | 8/2013 | Zhang et al. | 709/225 |
| 2013/0286869 A1* | 10/2013 | Woelker et al. | 370/252 |
| 2013/0329653 A1* | 12/2013 | Russell et al. | 370/329 |
| 2014/0007076 A1* | 1/2014 | Kim et al. | 717/173 |
| 2014/0068594 A1* | 3/2014 | Young et al. | 717/172 |
| 2014/0068597 A1* | 3/2014 | Hirahara | 717/173 |
| 2014/0223424 A1* | 8/2014 | Han | 717/173 |

OTHER PUBLICATIONS

Madueño et al., "How Many Smart Meters can be Deployed in a GSM cell?", 2013 IEEE, IEEE ICC'13, Jun. 9-13, 2013, pp. 1263-1268; <http://ieeexplore.ieee.org/stamp/stamp.jsp?tp=&arnumber=6649431>.*

Chang et al., "Dynamic software update model for remote entity management of machine-to-machine service capability", Jan. 4, 2013 IET Communications, vol. 7, Issue. 1, pp. 32-39; <http://ieeexplore.ieee.org/stamp/stamp.jsp?tp=&arnumber=6471295>.*

Bojic et al., "Communication in Machine-to-Machine Environments", 2012 ACM, BCI'12, Sep. 16-20, 2012, Novi Sad, Serbia, pp. 283-286; <http://dl.acm.org/results.cfm?h=1&cfid=426126065&cftoken=89011491>.*

* cited by examiner

COST OPTIMIZATION FOR FIRMWARE UPDATES FOR GLOBALLY MOBILE MACHINE-TO-MACHINE DEVICES

TECHNICAL FIELD

The present invention relates to the telecommunications field and, in particular, to a firmware control management device and a method implemented by the firmware control management device for determining whether or not to push a firmware update to a machine-to-machine (M2M) device.

BACKGROUND

The following abbreviations and terms are herewith defined, at least some of which are referred to within the following description of the state of the art and the present invention.
3GPP Third Generation Partnership Project
BTS Base Transceiver Station
DDC Device Detection Component
GMLC Gateway Mobile Location Center
GPS Global Positioning Satellite
GTCS Geo-Fencing Tracking and Control System
GUI Graphical User Interface
HLR Home Location Register
HSS Home Subscriber Server
IMSI International Mobile Subscriber Identity
LTE Long-Term Evolution
M2M Machine to Machine
MNO Mobile Network Operator
MPS Mobile Positioning Server
MSISDN Mobile Subscriber ISDN Number
MVNO Mobile Virtual Network Operator
OMA Open Mobile Alliance
OMA-DM Open Mobile Alliance-Device Management
RDM Remote Device Manager
ROM Read-Only-Memory
SGSN Serving GPRS Support Node
SNMP Simple Network Management Protocol
SMS Short Message Service
SUPL Secure User Plane Location
TCO Total Cost of Ownership
TR Technical Report
USSD Unstructured Supplementary Service Data
Firmware: Firmware is a software program or set of instructions programmed on a Device Processor (e.g., on an M2M device). The firmware provides the necessary instructions for how the device functions and communicates with the other hardware and software. Firmware is typically stored in the flash read-only-memory (ROM) of the hardware device. The ROM can be "flash" ROM which can be erased and rewritten only by an authorized user. Hence, firmware can be "semi-permanent" since it remains the same unless it is updated by a firmware updater. The firmware may be updated to provide the hardware device new functionality or to simply make the hardware device operate more efficiently.
M2M: In the field of cell phone networks, M2M refers to devices other than cell phones which use the wireless network to communicate with other devices or networks. Typically, a small device known as an M2M module is embedded in a larger device that needs to communicate over the wireless network. The M2M module contains the same type of radio and data circuits that would be found in a typical cell phone, but nothing else (no display or keypad, etc.). M2M modules can be embedded in things such as vending machines, automobiles, containers, alarm systems, and remote sensors.

M2M communications over 3GPP networks and/or other access networks such as WiFi, Zigbee etc. . . . is a fast-expanding area. There are many drivers for this including the reduction in prices of the M2M devices in response to economies of scale and Moore's Law. M2M device management presents an interesting management challenge. In the past, "network management" addressed the management of network nodes, for instance core network elements like the SGSN, and radio network elements such as the BTS, routers etc. However, with the advent of M2M technology, the M2M devices themselves are part of what needs to be managed. This is conceptually similar to a mobile operator needing to manage all of the mobile handsets in their network via an operation center. There are applications available today for doing this, such as Ericsson's RDM (Remote Device Manager) platform which supports the remote management of TR069 enabled M2M devices. In this regard, the idea of "network management on a device level" is only the first part associated with the management of M2M devices. Next, we discuss the management of M2M devices in an even broader context.

Currently, most M2M solutions fit comfortably within one operator's network. In general, many of the M2M devices are not very mobile and the ones that are mobile are mobile within one network. Consider an application such as nascent M2M applications in automobiles that are even now migrating to 3GPP-based technology. It can be seen that in the vast majority of cases, sufficient connectivity can be provided under the umbrella of one operator, whether MNO or MVNO. However, with the advent of cloud computing there is a class of M2M applications that is now being deployed and that will expand very rapidly in the coming few years. This class of M2M applications is best exemplified by asset tracking and management. To exemplify this case, one can consider that of refrigerated container management. Refrigerated containers can contain perishable goods with a very high value. The refrigerated containers themselves need to be tracked, which is fairly simple, but more importantly, the conditions inside the refrigerated container need to be monitored and controlled. This level of management needs to be possible, in general, virtually anywhere in the world.

It can be readily appreciated that the M2M devices associated with these refrigerated containers (or other tracked components) will need to be managed well beyond the perimeters of a single operator's network. It can also be appreciated that this is true for an entire class of M2M devices which can be expected to be used globally. Finally, it should be noted that a large part of the world's surface is covered with water and that many of these M2M devices will spend a significant amount of time at sea, where connectivity can be provided via satellite-connected base stations, but where the connectivity costs are much higher due to the use of a satellite link. This operational context is the second part associated with managing M2M devices.

If one takes both parts of these operational contexts into account to manage M2M devices, it can be seen that there is a need for M2M device management on a pan-operator basis. From a pure communication point of view, this is not really an issue, as the M2M devices are either in a "home" operator network or in a "visited" network which is owned by the operator's roaming partner. In such cases, the M2M devices could be under coverage, either within their home network or a visited network, provided via a satellite link. However, there is one special case regarding network management on a M2M device level that should be addressed because it can significantly affect whether the specific M2M application can be profitably employed over the solution's lifespan. This one special case relates to firmware updates (i.e., software updates). Like many devices, M2M devices can, and will, require firmware updates. In some cases, these firmware updates are relatively minor, for instance to support minor enhancements. In other cases, these firmware updates are critical because the M2M devices may have been found to have performance faults which can result in the disruption to networks or the M2M device going "down" in a way that requires a great deal of manual intervention (e.g. tracking the container manually, resetting the communication device etc.) to address the particular problem.

As can be appreciated, to provide firmware updates for large numbers of M2M devices located in roaming "visited" partner networks or satellite-connected radio networks can be very expensive and can significantly affect the business case of the M2M application. In addition, there can be cost differentials associated with providing for firmware updates depending on whether a M2M device is active in a 2G, 3G or LTE network (consider data download speeds/volumes). Accordingly, there is a need for an effective way to manage firmware updates in a cohesive manner for a large number of M2M devices that can be basically located anywhere in the world, in the most cost-effective manner possible.

SUMMARY

A firmware control management device and method that address the aforementioned firmware updated problems are described in the independent claims of the present application. Advantageous embodiments of the firmware control management device and the method have been described in the dependent claims of the present application.

In one aspect, the present invention provides a firmware control management device for determining whether or not to push a firmware update to a M2M device. The firmware control management device comprises at least a processor and a memory that stores processor-executable instructions where the processor interfaces with the memory and executes the processor-executable instructions to enable a receive operation, a retrieve operation, three obtain operations and a determine operation. The receive operation includes receiving a notification from the M2M device. The retrieve operation includes retrieving M2M configuration information associated with the M2M device. The first obtain operation includes obtaining information related to firmware associated with the M2M device. The second obtain operation includes obtaining information which indicates a network that is currently connected to the M2M device. The third obtain operation includes obtaining information related to the network currently connected to the M2M device. The determine operation includes determining whether or not to push the firmware update to the M2M device based at least on the M2M configuration information, the information related to firmware associated with the M2M device, and the information related to the network currently connected to the M2M device. An advantage of the firmware control management device is that it can effectively manage firmware updates in a cohesive manner for a large number of M2M devices which can be basically located anywhere in the world.

In another aspect, the present invention provides a method implemented by a firmware control management device for determining whether or not to push a firmware update to a M2M device. The method comprises a receiving step, a retrieving step, three obtaining steps and a determining step. The receiving step includes receiving a notification from the M2M device. The retrieving step includes retrieving M2M configuration information associated with the M2M device. The first obtaining step includes obtaining information related to firmware associated with the M2M device. The second obtaining step includes obtaining information which indicates a network that is currently connected to the M2M device. The third obtaining step includes obtaining information related to the network currently connected to the M2M device. The determining step includes determining whether or not to push the firmware update to the M2M device based at least on the M2M configuration information, the information related to firmware associated with the M2M device, and the information related to the network currently connected to the M2M device. An advantage of the method is that it can effectively manage firmware updates in a cohesive manner for a large number of M2M devices which can be basically located anywhere in the world.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
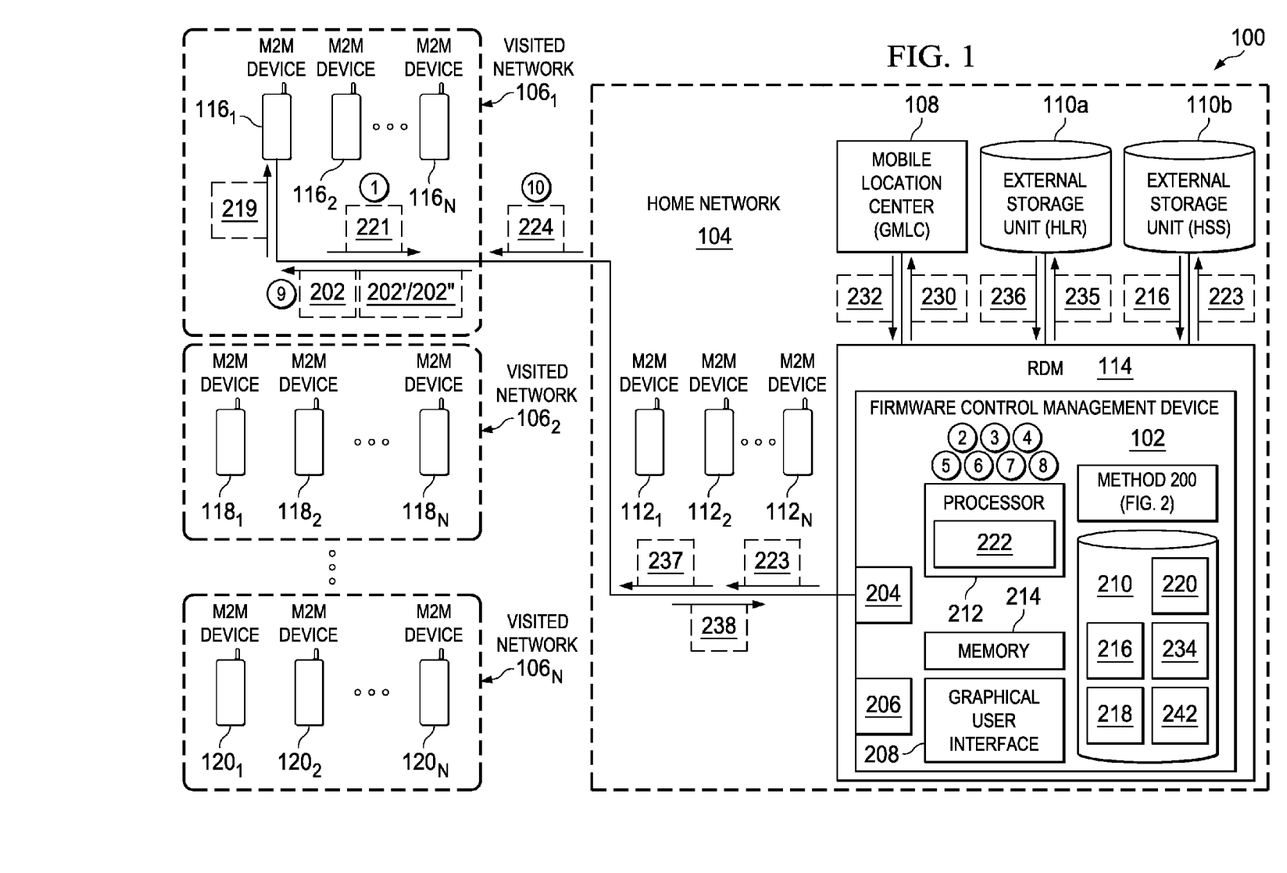
FIG. 1 is a basic diagram of an exemplary wireless communication system used to help describe a firmware control management device which is configured in accordance with an embodiment of the present invention.

Referring to FIG. 1, there is a basic diagram of an exemplary wireless communication system 100 used to help describe a firmware control management device 102 which is configured in accordance with an embodiment of the present invention. The exemplary wireless communication system 100 includes a home network 104 and multiple visited networks $106_1, 106_2 \ldots 106_n$. In this basic diagram, the home network 104 is shown including a mobile location center 108 (e.g., GMLC 108), two external storage units 110a and 110b (e.g., HLR 110a, HSS 110b), multiple M2M devices $112_1, 112_2, \ldots 112_n$, and a RDM 114. The RDM 114 is shown incorporating the firmware control management device 102 but it should be appreciated that the firmware control management device 102 could be incorporated within any telecommunications node or it could be a stand-alone device. The visited networks $106_1$, $106_2$ ... $106_n$ are each shown as including multiple roaming M2M devices $116_1$, $116_2$ ... $116_n$, $118_1$, $118_2$ ... $118_n$, and $120_1$, $120_2$ ... $120_n$. The M2M devices $112_1$, $112_2$ ... $112_n$, $116_1$, $116_2$ ... $116_n$, $118_1$, $118_2$ ... $118_n$, and $120_1$, $120_2$ ... $120_n$ can be the same type but would typically be different devices with different functions. The person skilled in the art will appreciate that the home network 104 and the multiple visited networks $106_1$, $106_2$ ... $106_n$ include many other well known components but for clarity only the components such as the firmware control management device 102, the mobile location center 108 (e.g., GMLC 108), the external storage units 110a and 110b (e.g., HLR 110a, HSS 110b), the M2M devices $112_1$, $112_2$ ... $112_n$, $116_1$, $116_2$ ... $116_n$, $118_1$, $118_2$ ... $118_n$, and $120_1$, $120_2$ ... $120_n$ which are needed to explain the present invention have been described in detail herein. In this regard, the firmware control management device 102 is described in detail next utilizing the basic wireless communication system 100 diagram associated with FIG. 1 and the various flowcharts associated with FIGS. 2-4.

As shown in FIG. 1, the firmware control management device 102 includes at least an input interface 204, an output interface 206, a graphical user interface 208, a database 210, a processor 212, and a memory 214. The input interface 204 is used to receive signals from components in the home network 104 and visited networks $106_1$, $106_2$ ... $106_n$. The output interface 204 is used to send signals to components in the home network 104 and visited networks $106_1$, $106_2$ ... $106_n$. The graphical user interface 208 is used so an operator (not shown) can interface with to configure or otherwise control the firmware management control device 102. The database 210 can store a wide range of information including, for example, M2M configuration information 216, firmware information 218 and network information 220. The M2M configuration information 216 includes information such as the identity of the home network (plus cheapest cooperating network), current firmware level, device type, and capabilities of each of the M2M devices $112_1$, $112_2$ ... $112_n$, $116_1$, $116_2$ ... $116_n$, $118_1$, $118_2$ ... $118_n$, and $120_1$, $120_2$ ... $120_n$. The firmware information 216 includes information about the current firmware upgrades, firmware levels (past firmware upgrades), firmware upgrade dependencies etc. ... associated with specific types of M2M devices $112_1$, $112_2$ ... $112_n$, $116_1$, $116_2$ ... $116_n$, $118_1$, $118_2$ ... $118_n$, and $120_1$, $120_2$ ... $120_n$. The network information 220 includes information about the costs associated with using the home network 104 and visited networks $106_1$, $106_2$ ... $106_n$ to communicate with and download information to the specific M2M devices $112_1$, $112_2$ ... $112_n$, $116_1$, $116_2$ ... $116_n$, $118_1$, $118_2$ ... $118_n$, and $120_1$, $120_2$ ... $120_n$. Alternatively, the firmware control management device 102 may retrieve any of the necessary M2M configuration information 216, the firmware information 218 and/or the network information 220 from other components such as the external storage units 110a and 110b rather than store this information 216, 218 and 220 on-site or in the event that the database 210 does not currently store the needed information 216, 218 and/or 220. The person skilled in the art will appreciate that the firmware control management device 102 may include other components and functionalities but for clarity only the components and functionalities which are needed to explain the present invention have been described in detail herein.

The firmware control management device 102 is configured to determine whether or not to push a firmware update 202 to one of the M2M devices $116_1$ (for example) in accordance with an embodiment of the present invention. To accomplish this, the processor 212 interfaces with the memory 214 which stores processor-executable instructions and then executes the processor-executable instructions to enable operations as follows: (1) receive a notification 221 from the M2M device $116_1$ (step 1); (2) retrieve M2M configuration information 216 associated with the M2M device $116_1$ (step 2); (3) obtain firmware information 218 associated with the M2M $116_1$ (step 3); (4) determine based on the M2M configuration information 216 and the firmware information 218 associated with the M2M device $116_1$ whether or not the firmware currently loaded in the M2M device $116_1$ is a latest version (step 4—optional); (5) if the firmware currently loaded in the M2M device $116_1$ is the latest version, then end the process since no further firmware updating is needed with respect to the M2M device $116_1$ (step 5—optional); (6) if the firmware currently loaded in the M2M device $116_1$ is not the latest version, then proceed to obtain information 222 which indicates the particular network $106_1$ currently connected to the M2M device $116_1$ (step 6) (note: if step 4 is not performed then step 6 is performed after step 3); (7) obtain information 220 related to the network $106_1$ currently connected to the M2M device $116_1$ (step 7); (8) determine whether or not to push the firmware update 202 (i.e., the latest firmware software) to the M2M device $116_1$ based at least on the M2M configuration information 216, the information 218 related to firmware associated with the M2M device, and the information 220 related to the network $106_1$ currently connected to the M2M device $116_1$ (step 8); (9) if there is a determination to push the firmware update 202 to the M2M device $116_1$ then push one or more firmware updates 202 to the M2M device $116_1$ (step 9); and (10) if there is a determination not to push the firmware update 202 to the M2M device $116_1$ then send a message 224 to instruct the M2M device $116_1$ to enter a quite mode until the M2M device $116_1$ connects to another network 104, $106_2$ ... $106_n$ (step 10). A detailed discussion about different exemplary ways that the firmware control management device 102 can implement steps 1, 2, 3, 4, 5, 6, 7, 8, 9, and 10 is described next with respect to FIGS. 2-4.

Figure 2:
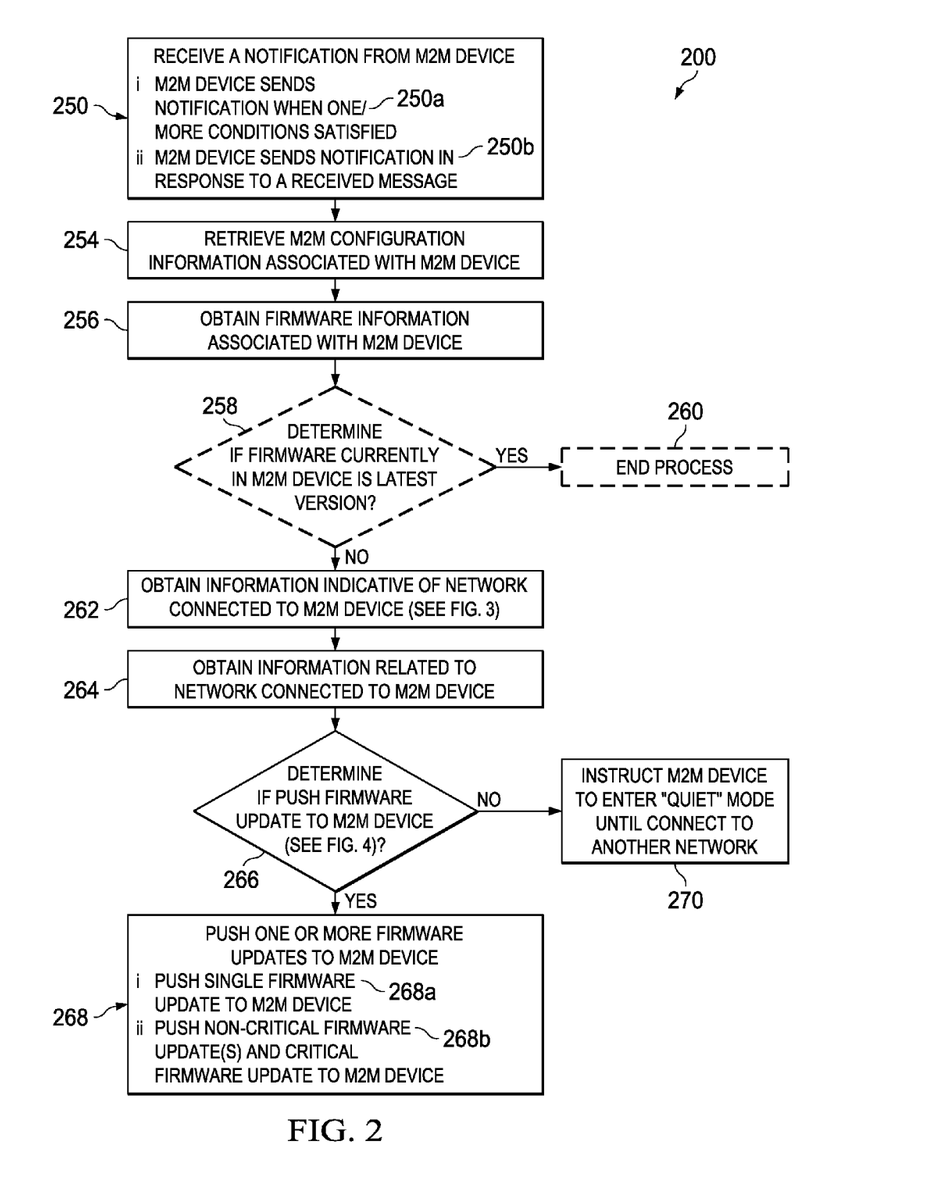
FIG. 2 is a flowchart of an exemplary method which is implemented by the firmware control management device shown in FIG. 1 for determining whether or not to push a firmware update to one of the M2M devices shown in FIG. 1 in accordance with an embodiment of the present invention.

Referring to FIG. 2, there is a flowchart of an exemplary method 200 which is implemented by the firmware control management device 102 for determining whether or not to push a firmware update 202 to one of the M2M devices $116_1$ (for example) in accordance with an embodiment of the present invention. Beginning at step 252, the firmware control management device 102 receives a notification 221 from the M2M device $116_1$. Typically, the M2M device $116_1$ occasionally checks with the RDM 114 or firmware control management device 102 by sending the notification 221 after, or as part of, performing a network access (step 252a). Plus, the M2M device $116_1$ can send the notification 221 based on a specific event such as for instance: (a) a timer expiration at the M2M device $116_1$; (b) a change of networks 104 and $106_1$, $106_2$ ... $106_n$ by the M2M device $116_1$ (e.g., M2M device $116_1$ roamed from network $106_2$ to network $106_1$); and (c) meeting a set of conditions previously received in a message 223 from the RDM 114 or the firmware control management device 102—these conditions can include for example the device state, location, and network access type (step 252a). Alternatively, the RDM 114 or firmware control management device 120 can send a message 219 (e.g., SMS message) to "wake-up" the M2M device $116_1$ and cause the M2M device $116_1$ to send the notification 221 (step 252b). For instance, the RDM 114 or firmware control management device 120 can send the message 219 based on (for example): an expiration of a timer, a query via external interface (such as web portal), a scan through a device register triggered manually or automatically. In any case, the firmware control management device 102 upon receiving the notification 221 will then have identifying information such as the IMSI and/or the MSISDN that corresponds to the subscription for the M2M device $116_1$.

At step 254, the firmware control management device 102 retrieves M2M configuration information 216 associated with the M2M device $116_1$. For instance, the firmware control management device 102 can utilize the IMSI and/or the MSISDN associated with the M2M device $116_1$ as a key to query the database 210 to obtain the M2M configuration information 216 such as the current loaded firmware and capabilities of M2M device $116_1$. Alternatively, the firmware control management device 102 can utilize the IMSI and/or the MSISDN associated with the M2M device $116_1$ as a key in a query 223 to obtain the M2M configuration information 216 from some other component (e.g., HSS 110b) within the wireless communication system 100.

At step 256, the firmware control management device 102 obtains firmware information 218 associated with the M2M $116_1$. For instance, the firmware control management device 102 can utilize the retrieved M2M configuration information 216 associated with the M2M device $116_1$ to determine the type of firmware software that is used by the M2M device $116_1$ and then use that information to obtain the firmware information 218 from the database 210 or some other component in the wireless communication system 100. The retrieved firmware information 218 which is associated with the M2M device $116_1$ can include (for example): (a) information about the current firmware upgrades; (b) firmware levels (past firmware upgrades); (c) a number of firmware images to be updated at the M2M device $116_1$; (d) an installation order of the firmware images; (e) dependencies between the firmware images to be updated at the M2M device $116_1$; and (f) the firmware file size for each of the updates.

At step 258 (optional), the firmware control management device 102 determines based on the M2M configuration information 216 and the firmware information 218 associated with the M2M device $116_1$ whether or not the firmware currently loaded in the M2M device $116_1$ is a latest version. If the firmware currently loaded in the M2M device $116_1$ is the latest version, then at step 260 the process is ended since no further firmware updating is needed with respect to the M2M device $116_1$. However, the firmware control management device 102 can still perform other activities such as logging the time that the notification 221 was received from the M2M device $116_1$. If the firmware currently loaded in the M2M device $116_1$ is not the latest version, then proceed to step 262 to continue the firmware update method 200. It should be appreciated that steps 258 and 260 are optional and if this feature is not implemented then the firmware update method 200 would proceed from step 256 to step 262.

At step 262, the firmware control management device 102 obtains information 222 which indicates the particular network $106_1$ that is currently connected to the M2M device $116_1$. The firmware control management device 102 can obtain this information 222 utilizing anyone of several different ways such as (for example): (1) query a remote node (e.g., GMLC 108, HLR 110a) to obtain this information 222; or (2) obtain the information 222 directly from the M2M device $116_1$—assuming the M2M device 1116 has the capability to provide this information 222—where this capability can be determined from the M2M configuration data 216 or received explicitly or implicitly (such as a classmark) from the M2M device $116_1$. These exemplary ways of performing step 262 to obtain the information 222 which indicates the particular network $106_1$ that is currently connected to the M2M device $116_1$ are discussed in more detail below with respect to FIG. 3.

At step 264, the firmware control management device 102 obtains information 220 related to the network $106_1$ which is currently connected to the M2M device $116_1$. The network information 220 includes information about the costs associated with using the network $106_1$ to communicate with and download firmware 202 to the M2M device $116_1$. These costs may be based on the time of day and particular location of the M2M device $116_1$. As discussed above, the firmware control management device 102 can query the database 210 or some other component within the wireless communication system 100 to obtain this information 220.

At step 266, the firmware control management device 102 determines whether or not to push the firmware update 202 (i.e., the latest firmware software) to the M2M device $116_1$ based at least on the M2M configuration information 216, the firmware information 218, and the information 220 related to the network $106_1$ which is currently connected to the M2M device $116_1$. The firmware control management device 102 can make this determination utilizing anyone of several different ways such as (for example) determining whether the firmware update 202 is a critical firmware update 202' or a non-critical firmware update 202". This particular exemplary way of performing step 266 is discussed in more detail below with respect to FIG. 4.

At step 268, the firmware control management device 102 upon determining to push the firmware update 202 to the M2M device $116_1$ then pushes one or more firmware updates 202 to the M2M device $116_1$. For instance, the firmware control management device 102 can depending on the circumstances push a single firmware update 202 to the M2M device $116_1$ (step 268a), or push one or more non-critical firmware updates 202' to the M2M device $116_1$ and then push a critical firmware update 202" to the M2M device $116_1$ (step 268b).

At step 270, the firmware control management device 102 upon determining not to push the firmware update 202 to the M2M device $116_1$ can send a message 224 to instruct the M2M device $116_1$ to enter a quite mode until the M2M device $116_1$ connects to another network 104, $106_2 \ldots 106_n$. Alternatively, the firmware control management device 102 could simply not push the firmware update 202 to the M2M device $116_1$.

Figure 3:
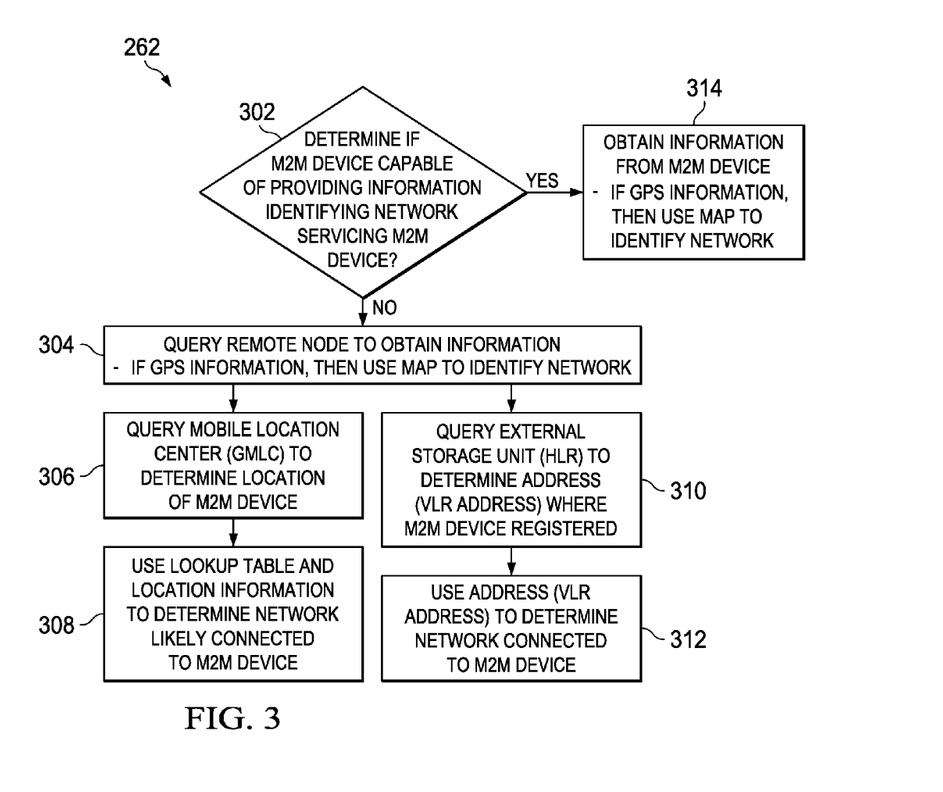
FIG. 3 is a flowchart which illustrates exemplary steps that can be performed to implement the second obtaining step of the method shown in FIG. 2 in accordance with an embodiment of the present invention.

Referring to FIG. 3, there is a flowchart which illustrates exemplary steps that can be performed to implement step 262 so as to obtain the information 222 which indicates the particular network $106_1$ that is currently connected to the M2M device $116_1$. Beginning at step 302, the firmware control management device 102 determines based on the retrieved M2M configuration information 216 if the M2M device $116_1$ is capable of providing information identifying the network $106_1$ which is currently serving the M2M device $116_1$. If the M2M device $116_1$ is not capable of providing the information, then the firmware control management device 102 performs step 304 and sends a query to a remote node (e.g., GMLC 108, HLR 110a) to obtain the information indicative of the network $106_1$ currently connected to the M2M device $116_1$ and the M2M device's current location. For example, the firmware control management device 102 can perform step 304 by: (a) triggering a query 230 to the mobile location center 108 (e.g., GMLC 108) to receive information 232 about the location of the M2M device $116_1$ (step 306); and (b) using a lookup table 234 along with the location information 232 of the M2M device $116_1$ to determine the network $106_1$ which is likely connected to the M2M device $116_1$ (step 308). In another example, the firmware control management device 102 can perform step 304 by: (a) triggering a query 235 to the external storage unit 110 (e.g., HLR 110a) to obtain an address 236 (e.g., VLR address 236) where the M2M device $116_1$ is registered (step 310); and (b) using the address 236 (e.g., VLR address 236) to determine the network $106_1$ connected to and servicing the M2M device $116_1$ (step 312). If the M2M device $116_1$ is capable of providing the information, then the firmware control management device 102 performs step 314 and sends a query 237 to the M2M device $116_1$ to obtain information 238 identifying the network $106_1$ connected to and servicing the M2M device $116_1$. The M2M device $116_1$ can provide this information in a variety of ways including transferring the information 238 via an in-band message as part of an extension to existing protocols, are via other transport mechanisms, such as SMS, USSD, IP datagram, OMA SUPL etc. . . . If during steps 306 and 314, the firmware control management device 102 receives information 232 and 238 which is in the form of GPS coordinates of the M2M device $116_1$ then the firmware control management device 102 can use a map function 242 along with the GPS coordinates to determine the network $106_1$ which is likely to be currently connected to and servicing the M2M device $116_1$. This map function 242 can also provide a first level of filtering in that it can determine immediately if the update process should be stopped for costs or other reasons (e.g. using a variant of the GTCS currently used to control radio transmissions in the maritime market).

Figure 4:
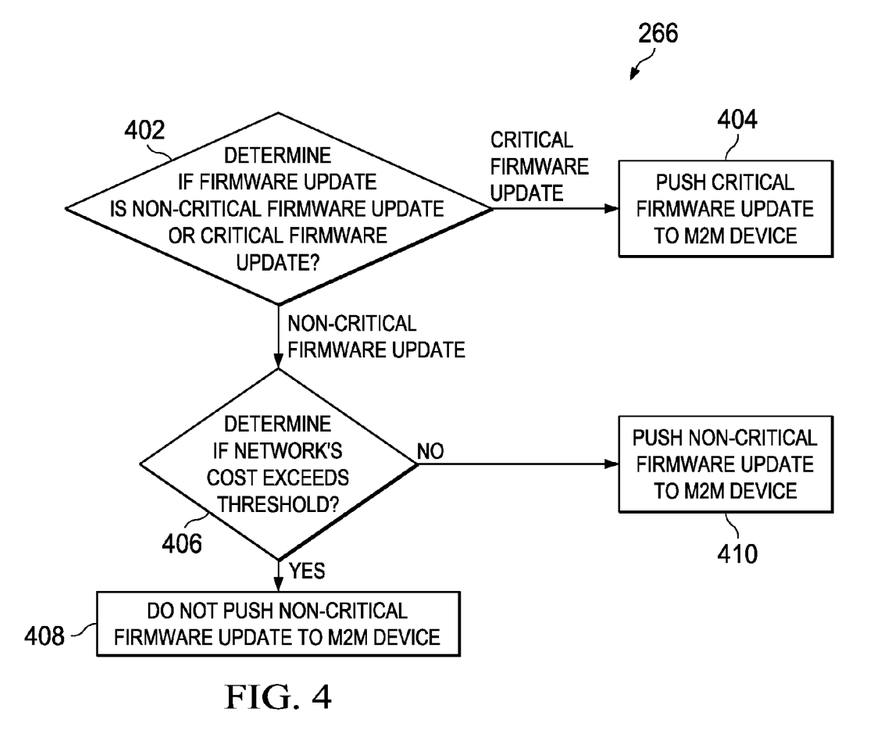
FIG. 4 is a flowchart which illustrates exemplary steps that can be performed to implement the determining step of the method shown in FIG. 2 in accordance with an embodiment of the present invention.

Referring to FIG. 4, there is a flowchart which illustrates exemplary steps that can be performed to implement step 266 and determine whether or not to push the firmware update 202 (i.e., the latest firmware software) to the M2M device $116_1$. Beginning at step 402, the firmware control management device 102 determines if the firmware update 202 is a non-critical firmware update 202' or a critical firmware update 202". If the firmware update is a critical firmware update 202", then the firmware control management device 102 at step 404 pushes the critical firmware update 202" to the M2M device $116_1$. If the firmware update is a non-critical firmware update 202', then the firmware control management device 102 at step 406 determines if the cost of using the network $106_1$ to push the non-critical firmware update 202' to the M2M device $116_1$ exceeds a threshold. If the cost exceeds the threshold, then the firmware control management device 102 at step 408 does not push the non-critical firmware update 202' to the M2M device $116_1$. If the cost does not exceed the threshold, then the firmware control management device 102 at step 410 pushes the non-critical firmware update 202' to the M2M device $116_1$.

In view of the foregoing, one skilled in the art will appreciate that the described firmware control management device 102 and associated method 200 provides a unique and effective way for determining whether or not to push a firmware update 202 to a M2M device $116_1$. Although the above description describes the firmware control management device 102 as determining whether or not to push a firmware update 202 to a single M2M device $116_1$ it should be understood that the firmware control management device 102 can determine whether or not to push the same or different firmware updates 202 to large numbers of M2M devices $112_1$, $112_2$ . . . $112_n$, $116_1$, $116_2$ . . . $116_n$, $118_1$, $118_2$ . . . $118_n$, and $120_1$, $120_2$ . . . $120_n$. It should also be appreciated that the firmware control management device 102 can be implemented in any type of communications network 100 (e.g., 2G, 3G, LTE) and in fact the firmware control management device 102 may determine whether or not to push a firmware update to any type of mobile device (e.g., UE, smart phone) as opposed to or in addition to M2M devices $112_1$, $112_2$ . . . $112_n$, $116_1$, $116_2$ . . . $116_n$, $118_1$, $118_2$ . . . $118_n$, and $120_1$, $120_2$ . . . $120_n$. Furthermore, it should be appreciated that the firmware control management device 102 and method 200 are a marked-improvement over the prior art since the prior art does not take into account airtime costs associated with the connectivity type coupled with the location of the M2M device. This means that in the prior art all firmware updates are pushed out to M2M devices regardless of criticality which can cause increased airtime/roaming costs. The firmware control management device 102 and method 200 address this particular problem and other problems associated with the prior art.

Figure 5:
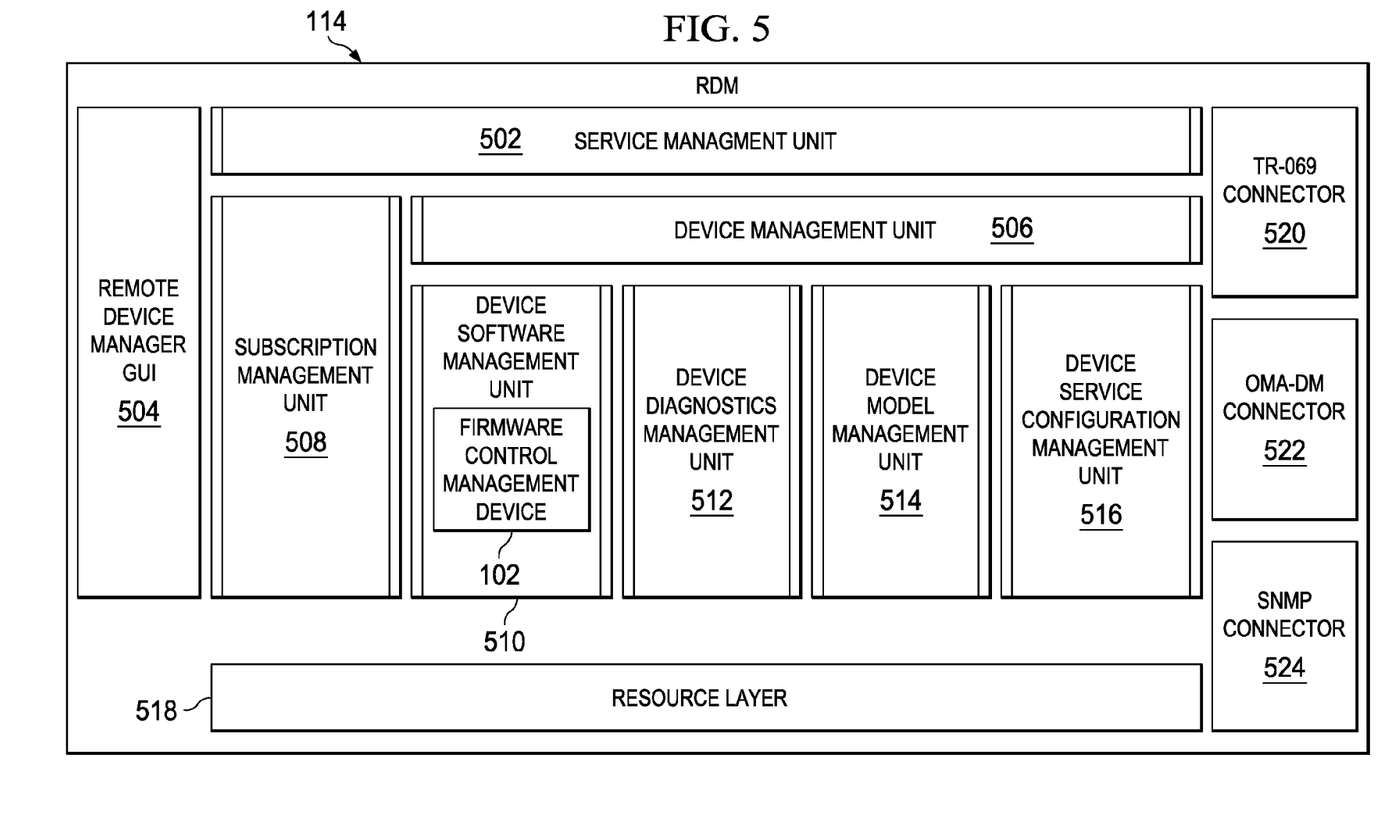
FIG. 5 is a basic diagram illustrating how Ericsson's Remote Device Manager can be enhanced to incorporate the firmware control management device shown in FIG. 1 in accordance with an embodiment of the present invention.

As discussed above, the firmware control management device 102 can be a standalone device or added to existing nodes such as Ericsson's Remote Device Manager 104 (as shown in FIG. 1) or Ericsson's GTCS node. Referring to FIG. 5, there is a basic diagram illustrating Ericsson's Remote Device Manager 104 enhanced to incorporate the firmware control management device 102. Basically, Ericsson's Remote Device Manager 104 includes the following components: a service management unit 502, a remote device manager GUI 504, a device management unit 506, a subscription management unit 508, a device software management unit 510 (enhanced to include the firmware control management device 102), a device diagnostics management unit 512, a device model management unit 514, a device service configuration management unit 516, a resource layer 518, a TR-069 connector 520, an OMA-DM connector 522, and a SNMP connector 524. In any case, the firmware control management device 102 has many desirable features-functionalities as discussed above and some additional features-functionalities as discussed below:

1. The firmware control management device 102 optimizes firmware updates 202 according to a configurable set of rules which indicate what network conditions need to be met before updating M2M device's firmware.

2. The firmware control management device 102 has a protocol and related control logic for interworking with a data downloader and a data client for controlling firmware downloads to remote M2M devices $112_1$, $112_2$ . . . $112_n$, $116_1$, $116_2$ . . . $116_n$, $118_1$, $118_2$ . . . $118_n$, and $120_1$, $120_2$ . . . $120_n$.

3. The firmware control management device 102 has a sub-function that determines the location of the M2M device $112_1$, $112_2$ . . . $112_n$, $116_1$, $116_2$ . . . $116_n$, $118_1$, $118_2$ . . . $118_n$, and $120_1$, $120_2$ . . . $120_n$ (geographically or the network number).

4. The firmware control management device 102 can have logic to analyze the chain of firmware upgrade dependencies to determine the priority (criticality) for the whole chain of firmware upgrades.

5. The firmware control management device 102 can have logic to instruct one or more of the M2M devices $112_1$, $112_2$ . . . $112_n$, $116_1$, $116_2$ . . . $116_n$, $118_1$, $118_2$ . . . $118_n$, and $120_1$, $120_2$ . . . $120_n$ to perform only minimal functions until the next firmware update (e.g. to prevent network disturbances).

6. The firmware control management device 102 can have logic to send a set of rules to the M2M devices $112_1$, $112_2$ . . . $112_n$, $116_1$, $116_2$ . . . $116_n$, $118_1$, $118_2$ . . . $118_n$, and $120_1$, $120_2$ . . . $120_n$ that will tell them under what conditions they should contact the firmware control management device 102. These rules include the access type, location and device state.

7. The firmware control management device 102 may determine that the current M2M device's firmware is "disruptive" but the costs of updating the firmware are prohibitive. In this situation, the firmware control management device 102 can order the "disruptive" M2M device to operate in a safe mode and perform a minimum of network functions (such as only contacting the network after a location update) until the update can be performed.

8. The firmware control management device 102 in the event of epidemic failures has the capability to scan through the register of all M2M devices $112_1$, $112_2$ ... $112_n$, $116_1$, $116_2$ ... $116_n$, $118_1$, $118_2$ ... $118_n$, and $120_1$, $120_2$ ... $120_n$ to find the ones with disruptive firmware loads, identify their locations and then, based on rules, either update the firmware or order the M2M devices into a minimal communication mode.

9. The firmware control management device 102 can also facilitate the lawful intercept of M2M data from the M2M devices $112_1$, $112_2$ ... $112_n$, $116_1$, $116_2$ ... $116_n$, $118_1$, $118_2$ ... $118_n$, and $120_1$, $120_2$ ... $120_n$. This can be particularly useful for containers (which contain M2M devices) that leave international waters and enter sovereign/territorial waters. Today, there is a lot of security concerns around containers for several reasons like terrorism, illegal immigration, smuggling etc. . . . Today, the ships (which carry containers) need to register but the containers themselves do not need to be registered. Thus, the firmware control management device 102 can use the "wake-up and send a notification" feature to have the M2M device send its M2M information to the network when one or more conditions have been satisfied such as, for instance, entering sovereign/territorial waters. Once the M2M devices contact the network then the container data (part of the M2M data) can be intercepted and at least some basic information can be pulled-out by authorized law enforcement agencies. Of course, the container application is just one of a wide-range of applications that the firmware control management device 102 can be used to effectively enable monitoring by law enforcement agencies.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A method for determining whether or not to push a current firmware upgrade to a machine-to-machine (M2M) device, the method implemented by a firmware control management device in a wireless communication system comprising the steps of:
receiving a notification from the M2M device;
retrieving M2M configuration information associated with the M2M device, wherein said M2M configuration information comprises at least a current loaded firmware in the M2M device;
obtaining information related to the current firmware upgrade associated with the M2M device;
obtaining information which indicates a network currently connected to the M2M device, wherein the network currently connected to the M2M device is a visited network of the M2M device rather than a home network of the M2M device;
obtaining information related to the visited network currently connected to the M2M device, wherein the information related to the visited network currently connected to the M2M device comprises data costs associated with using the currently connected visited network to push the current firmware upgrade to the M2M device; and,
determining whether or not to push the current firmware upgrade to the M2M device based at least on the following parameters: (1) the current loaded firmware in the M2M device, (2) the current firmware upgrade associated with the M2M device, and (3) the data costs associated with using the currently connected visited network to push the current firmware upgrade to the M2M device.

2. The method of claim 1, wherein after the steps of retrieving the M2M configuration information associated with the M2M device and obtaining the information related to the current firmware upgrade associated with the M2M device but before the step of obtaining the information which indicates the network currently connected to the M2M device further comprising the steps of:
determining, based on the M2M configuration information and the information related to the current firmware upgrade associated with the M2M device, if the current loaded firmware in the M2M device is a latest version;
if the current loaded firmware in the M2M device is the latest version, then ending the process since no further firmware updating is needed with respect to the M2M device; and
if the current loaded firmware in the M2M device is not the latest version, then proceeding to obtain information indicative of the network currently connected to the M2M device.

3. The method of claim 1, wherein the step of obtaining the information which indicates the network currently connected to the M2M device further comprises the steps of:
determining, based on the M2M configuration information, if the M2M device is capable of providing information which identifies the network currently servicing the M2M device;
if the M2M device is not capable of providing the information, then sending a query a remote node to obtain the information indicative of the network connected to the M2M device; and
if the M2M device is capable of providing the information, then sending a query to the M2M device to obtain information identifying the network connected to the M2M device.

4. The method of claim 3, wherein the step of sending the query to the remote node to obtain information which indicates the network currently connected to the M2M device further comprises the steps of:
triggering a query to a mobile location center to receive information about a location of the M2M device; and
using a lookup table along with the location of the M2M device to determine the network which is likely connected to the M2M device.

5. The method of claim 3, wherein the step of sending the query to the remote node to obtain information which indicates the network currently connected to the M2M device further comprises the steps of:
triggering a query to an external storage unit to obtain an address where the M2M device is registered; and
using the address to determine the network currently connected to the M2M device.

6. The method of claim 3, wherein if the information indicative of the network connected to the M2M device is Global Positioning Satellite (GPS) coordinates of the M2M device then further comprising a step of using a map function along with the GPS coordinates to determine the network currently connected to the M2M device.

7. The method of claim 1, wherein the step of determining whether or not to push the firmware update to the M2M device further comprises the steps of:
  determining if the current firmware upgrade is a critical firmware update or a non-critical firmware update;
    if the current firmware upgrade is a critical firmware update, then pushing the critical firmware update to the M2M device;
    if the current firmware upgrade is a non-critical firmware update, then determining if the data costs of using the currently connected visited network to push the non-critical firmware update to the M2M device exceeds a threshold;
      if the data costs exceed the threshold, then do not push the non-critical firmware update to the M2M device; or
      if the data costs do not exceed the threshold, then push the non-critical firmware update to the M2M device.

8. The method of claim 1, wherein if there is a determination to push the current firmware upgrade to the M2M device then performing the steps of:
  pushing a single firmware update to the M2M device; or
  pushing one or more non-critical firmware updates to the M2M device and then pushing a critical firmware update to the M2M device.

9. The method of claim 1, wherein if there is a determination not to push the current firmware upgrade to the M2M device then performing the step of:
  instructing the M2M device to enter a quite mode until the M2M device connects to another network.

10. The method of claim 1, further comprising a step of:
  sending a message to the M2M device instructing the M2M device to send the notification.

11. The method of claim 1, further comprising steps of:
  sending a message to the M2M device where the message has one or more conditions which when satisfied result in the M2M device sending the notification and once the notification is received then enabling a lawful intercept of data which is transmitted from the M2M device.

12. The method of claim 1, wherein in addition to obtaining the information related to the current firmware upgrade associated with the M2M device also obtain information about:
  past firmware upgrades;
  a number of firmware images to be updated at the M2M device;
  an installation order of the firmware images;
  dependencies between the firmware images to be updated at the M2M device; and
  firmware file size for each of the updates.

13. The method of claim 1, wherein:
  the firmware control management device is in the home network; and
  the M2M device roamed from the home network to the visited network.

14. A firmware control management device in a wireless communication system for determining whether or not to push a current firmware upgrade to a machine-to-machine (M2M) device, the firmware control management device comprising:
  a processor; and
  a memory that stores processor-executable instructions where the processor interfaces with the memory and executes the processor-executable instructions to enable operations as follows:
    receive a notification from the M2M device;
    retrieve M2M configuration information associated with the M2M device, wherein said M2M configuration information comprises at least a current loaded firmware in the M2M device;
    obtain information related to the current firmware upgrade associated with the M2M device;
    obtain information which indicates a network currently connected to the M2M device, wherein the network currently connected to the M2M device is a visited network of the M2M device rather than a home network of the M2M device;
    obtain information related to the visited network currently connected to the M2M device, wherein the information related to the visited network currently connected to the M2M device comprises data costs associated with using the currently connected visited network to push the current firmware upgrade to the M2M device; and,
    determine whether or not to push the current firmware upgrade to the M2M device based at least on the following parameters: (1) the current loaded firmware in the M2M device, (2) the current firmware upgrade associated with the M2M device, and (3) the data costs associated with using the currently connected visited network to push the current firmware upgrade to the M2M device.

15. The firmware control management device of claim 14, wherein after retrieve the M2M configuration information associated with the M2M device and obtain the information related to the current firmware upgrade associated with the M2M device but before obtain the information indicative of the network connected to the M2M device the processor further executes the processor-executable instructions to enable operations as follows:
  determine, based on the M2M configuration information and the information related to the current firmware upgrade associated with the M2M device, if the current loaded firmware in the M2M device is a latest version;
    if the current loaded firmware in the M2M device is the latest version, then end process since no further firmware updating is needed with respect to the M2M device; and
    if the currently loaded firmware in the M2M device is not the latest version, then proceed to obtain information indicative of the network connected to the M2M device.

16. The firmware control management device of claim 14, wherein the processor further executes the processor-executable instructions to obtain the information which indicates the network currently connected to the M2M device by enabling operations as follows:
  determine, based on the M2M configuration information, if the M2M device is capable of providing information which identifies the network currently servicing the M2M device;
    if the M2M device is not capable of providing the information, then query a remote node to obtain the information indicative of the network connected to the M2M device; and
    if the M2M device is capable of providing the information, then send a query to the M2M device to obtain information identifying the network connected to the M2M device.

17. The firmware control management device of claim 16, wherein the processor further executes the processor-executable instructions to query the remote node to obtain information which indicates the network currently connected to the M2M device by enabling operations as follows:
- trigger a query to a mobile location center to receive information about a location of the M2M device; and
- use a lookup table along with the location of the M2M device to determine the network which is likely connected to the M2M device.

18. The firmware control management device of claim 16, wherein the processor further executes the processor-executable instructions to query the remote node to obtain information which indicates the network currently connected to the M2M device by enabling operations as follows:
- trigger a query to an external storage unit to obtain an address where the M2M device is registered; and
- use the address to determine the network currently connected to the M2M device.

19. The firmware control management device of claim 16, wherein if the information indicative of the network connected to the M2M device is Global Positioning Satellite (GPS) coordinates of the M2M device then the processor further executes the processor-executable instructions to use a map function along with the GPS coordinates to determine the network currently connected to the M2M device.

20. The firmware control management device of claim 14, wherein the processor further executes the processor-executable instructions to determine whether or not to push the current firmware upgrade to the M2M device by enabling operations as follows:
- determine if the current firmware upgrade is a critical firmware update or a non-critical firmware update;
  - if the current firmware upgrade is a critical firmware update, then push the critical firmware update to the M2M device;
  - if the current firmware upgrade is a non-critical firmware update, then determine if the data costs of using the currently connected visited network to push the non-critical firmware update to the M2M device exceeds a threshold;
    - if the data costs exceed the threshold, then do not push the non-critical firmware update to the M2M device; or
    - if the data costs do not exceed the threshold, then push the non-critical firmware update to the M2M device.

21. The firmware control management device of claim 14, wherein if there is a determination to push the current firmware upgrade to the M2M device then the processor further executes the processor-executable instructions to enable operations as follows:
- push a single firmware update to the M2M device; or
- push one or more non-critical firmware updates to the M2M device and then push a critical firmware update to the M2M device.

22. The firmware control management device of claim 14, wherein if there is a determination not to push the current firmware upgrade to the M2M device then the processor further executes the processor-executable instructions to enable operations as follows:
- instruct the M2M device to enter a quiet mode until the M2M device connects to another network.

23. The firmware control management device of claim 14, wherein the processor further executes the processor-executable instructions to enable operations as follows:
- send a message to the M2M device instructing the M2M device to send the notification.

24. The firmware control management device of claim 14, wherein the processor further executes the processor-executable instructions to enable operations as follows:
- send a message to the M2M device where the message has one or more conditions which when satisfied result in the M2M device sending the notification and once the notification is received then enable a lawful intercept of data which is transmitted from the M2M device.

25. The firmware control management device of claim 14, wherein in addition to obtaining the information related to the current firmware upgrade associated with the M2M device also obtain information about:
- past firmware upgrades;
- a number of firmware images to be updated at the M2M device;
- an installation order of the firmware images;
- dependencies between the firmware images to be updated at the M2M device; and
- firmware file size for each of the updates.

26. The firmware control management device of claim 14, wherein;
- the firmware control management device is in the home network; and
- the M2M device roamed from the home network to the visited network.

* * * * *

UNITED STATES PATENT AND TRADEMARK OFFICE
CERTIFICATE OF CORRECTION

PATENT NO.          : 8,938,731 B2
APPLICATION NO.     : 13/659115
DATED               : January 20, 2015
INVENTOR(S)         : Valentine et al.

Page 1 of 1

It is certified that error appears in the above-identified patent and that said Letters Patent is hereby corrected as shown below:

In the drawings

In Fig. 5, Sheet 5 of 5, in Box "502", in Line 1, delete "MANAGMENT" and insert -- MANAGEMENT --, therefor.

In the specification

In Column 5, Line 29, delete "interface 204" and insert -- interface 206 --, therefor.

In Column 5, Line 42, delete "information 216" and insert -- information 218 --, therefor.

In Column 5, Line 52, delete "$120_n$," and insert -- $120_n$. --, therefor.

In Column 7, Line 15, delete "query 223" and insert -- query 237 --, therefor.

In Column 7, Line 62, delete "device 1116" and insert -- device $116_1$ --, therefor.

In Column 9, Line 64, delete "communications" and insert -- communication --, therefor.

In Column 10, Line 15, delete "Manager 104" and insert -- Manager 114 --, therefor.

In Column 10, Line 18, delete "Manager 104" and insert -- Manager 114 --, therefor.

In Column 10, Line 20, delete "Manager 104" and insert -- Manager 114 --, therefor.

In the claims

In Column 16, Line 40, in Claim 26, delete "wherein;" and insert -- wherein: --, therefor.

Signed and Sealed this
Twenty-eighth Day of June, 2016

Michelle K. Lee
*Director of the United States Patent and Trademark Office*